| (12) | United States Patent | (10) Patent No.: | US 7,057,665 B2 |
|---|---|---|---|
| | Jung et al. | (45) Date of Patent: | Jun. 6, 2006 |

(54) DEINTERLACING APPARATUS AND METHOD

(75) Inventors: You-young Jung, Seoul (KR); Young-ho Lee, Seoul (KR); Seung-joon Yang, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 547 days.

(21) Appl. No.: 10/624,574

(22) Filed: Jul. 23, 2003

(65) Prior Publication Data

US 2004/0070686 A1 Apr. 15, 2004

(30) Foreign Application Priority Data

Jul. 25, 2002 (KR) ............................. 2002-43886

(51) Int. Cl.
   *H04N 7/01* (2006.01)

(52) U.S. Cl. ...................................... 348/452; 348/448

(58) Field of Classification Search ............... 348/448, 348/449, 451, 452, 441, 458, 459, 699, 700; H04N 7/01
   See application file for complete search history.

(56) References Cited

U.S. PATENT DOCUMENTS 5,027,201 A    6/1991  Bernard
5,159,451 A    10/1992 Faroudja et al.
5,777,682 A    7/1998  De Haan et al.
5,864,368 A *  1/1999  Kato et al. .................. 348/446
6,263,503 B1 * 7/2001  Margulis ..................... 725/81
6,340,990 B1 * 1/2002  Wilson ....................... 348/448
6,380,978 B1   4/2002  Adams et al.
6,891,571 B1 * 5/2005  Shin et al. .................. 348/448

FOREIGN PATENT DOCUMENTS

CN       1173776 A    2/1998

* cited by examiner

*Primary Examiner*—Michael H. Lee
(74) *Attorney, Agent, or Firm*—Staas & Halsey LLP

(57) ABSTRACT

A deinterlacing apparatus and method use a buffer unit having a previous field buffer, a current field buffer, and a next field buffer to store, sequentially, individual fields of an image signal; calculate a Sum of Absolute Difference (SAD) value of a predetermined search region unit with reference to a next field stored in the next field buffer and a previous field stored in the previous field buffer; determine whether the predetermined search region is a still region and whether a source of the image signal is a film based on the SAD value; uses a 3D interpolation unit to output adaptively a temporal interpolation value and a spatial interpolation value based on motion information; and adaptively select a deinterlacing result based on the previous field, the next field, and an output of the 3D interpolation unit according to a signal outputted from the still region/film mode detection unit.

39 Claims, 5 Drawing Sheets

DEINTERLACING APPARATUS AND METHOD

CROSS-REFERENCE TO RELATED APPLICATIONS

This application claims the benefit of Korean Application No. 2002-43886, filed Jul. 25, 2002, in the Korean Intellectual Property Office, the disclosure of which is incorporated herein by reference.

BACKGROUND OF THE INVENTION

1. Field of the Invention

The present invention relates to a deinterlacing apparatus and method, and, more particularly, to deinterlacing apparatus and method to distinguish and adaptively interpolate, accordingly, still regions and moving regions in an image.

2. Description of the Related Art

Figure 1A:
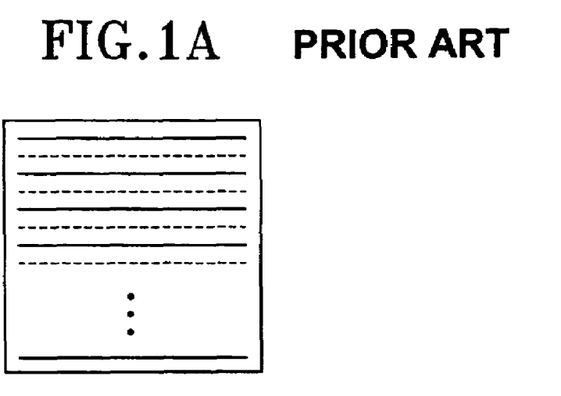
FIG. 1A to FIG. 1C are conventional views illustrating a screen scanning method.
Figure 1B:
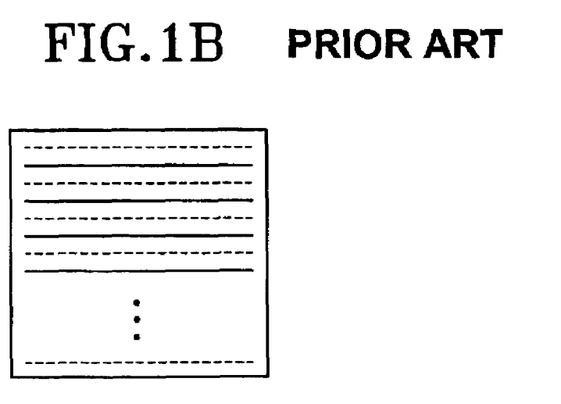
Figure 1C:
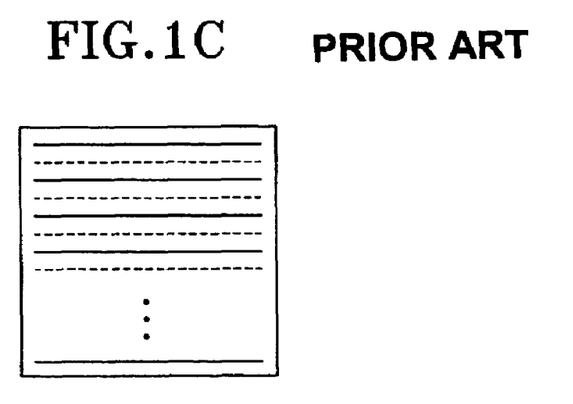

The interlaced scan mode and the progressive scan mode are typical scan modes in an image display device. The interlaced scan mode has been employed in general TVs, and, as shown in FIG. 1A to FIG. 1C, is the mode that divides one image frame into two fields and interlaces the two fields sequentially and alternately on the screen when displaying one image. The two fields are called a top and a bottom field, an upper field and a lower field, an odd field and an even field, respectively, and, in FIG. 1A to FIG. 1C, the solid lines indicate lines being scanned at present, and the dotted lines indicate lines scanned for a preceding display.

The progressive or non-interlaced scan mode has been employed for computer monitors, digital TVs, and the like. The non-interlaces scan mode is the mode that sets one image frame as a frame unit and displays an entire frame at a time just like projecting films on the screen. That is, in FIG. 1A to FIG. 1C, it refers to the mode in which the dotted lines are sequentially scanned together with the solid lines.

The deinterlacing apparatus refers to an apparatus that converts an image signal of the progressive scan method into an image signal of the interlacing scan mode. In a display device processing an image signal of the progressive scan mode, in order for an image signal of the progressive scan mode to be processed normally, a deinterlacing apparatus is required inside the display device to convert an image signal of the progressive scan mode into an image signal of the interlacing scan mode.

A method converting the progressive scan mode into the interlacing scan mode can be implemented in various ways.

For a basic method, a line repetition method simply repeats line information of a present field. The method is implemented with ease, but has a drawback in that the resolution of an interpolated screen falls in the middle, and a specific image at a specific timing may completely disappear.

In order to overcome the above drawbacks, an intra-field interpolation method implementing new fields by inserting data obtained from dividing the data of two lines by two into a region between the two lines of a present field, an inter-field interpolation method without motion compensation which implements one frame by inserting lines before and after a present field between the lines of the present field, and the like have been developed. Such methods have an advantage of simple hardware implementations, but have disadvantages of making errors when interpolating motion images, and deteriorating interpolated images or an image quality.

In order to make up for the disadvantages of the above methods, a motion-compensated interpolation method has been developed which divides an image on the screen into plural blocks with respect to successive field data on a basis of present field data, obtains motions with respect to the respective blocks, and interpolates an image of a present frame with reference to motion vectors. Such a motion-compensated interpolation method is disclosed in U.S. Pat. No. 5,777,682 (Motion-compensated Interpolation, issued Jul. 7, 1998).

Also, there is a motion adaptive interpolation method which estimates the degree of motion and interpolates a frame based on the motion. Such a motion adaptive interpolation method is disclosed in U.S. Pat. No. 5,027,201 (Motion Detection Apparatus As For An Interlace To Non-interlace Scan Converter, issued Jun. 25, 1991), U.S. Pat. No. 5,159,451 (Field Memory Expansible Line Doubler For Television Receiver, issued Oct. 27, 1992), and the like.

However, the motion-compensated interpolation method generally uses a motion vector of a block unit to estimate a motion, causing block artifacts on an interpolated image from time to time, since an error correction is accomplished by a block unit. Accordingly, a post-processing process is necessary to prevent the block artifacts, which leads to a considerably more complicated hardware structure, causing the price to rise accordingly. Further, the motion adaptive interpolation method relatively simplifies a hardware structure, which costs less upon implementation, but has a problem of deteriorating the performance of the image quality improvements.

SUMMARY OF THE INVENTION

The present invention has been devised to solve the above problems, so it is an aspect of the present invention to provide a deinterlacing apparatus and method having an outstanding effect to improve image quality while reducing costs upon implementation with a less complicated hardware structure than the hardware structure of the prior art.

Additional objects and advantages of the invention will be set forth in part in the description which follows and, in part, will be obvious from the description, or may be learned by practice of the invention.

To achieve the above and/or other aspects, a deinterlacing apparatus according to the present invention comprises a buffer unit having a previous field buffer, a current field buffer, and a next field buffer to store, sequentially, individual fields of an image signal which are successively inputted; a zero motion estimation unit to calculate a Sum of Absolute Difference (SAD) value by a predetermined search region unit with reference to a next field stored in the next field buffer and a previous field stored in the previous field buffer; a still region/film mode detection unit to determine whether the predetermined search region is a still region and whether a source of the image signal is a film based on the SAD value; a 3D interpolation unit to output a temporal interpolation (TI) value adaptively and a spatial interpolation (SI) value based on motion information; and an adaptive selection unit to output a deinterlacing result based on the previous field, the next field, and an output of the 3D interpolation unit according to a signal outputted from the still region/film mode detection unit.

Typically, the predetermined search region is a macro block having a predetermined size, and the zero motion estimation unit calculates the SAD value based on the following formula:

$$SAD=\Sigma\{(x,y)\epsilon B\}|f(x,y,t-1)-f(x,y,t+1)|,$$

wherein B is a sum of (x,y) indices corresponding to pixels inside the macro block and t represents time.

The still region/film mode detection unit generally includes a still region decision unit to determine whether the predetermined search region is the still region or a motion region based on the SAD value; a film mode detection unit to determine whether the source of an image signal is the film based on a result of the decision of the still region decision unit; and a multiplexing unit to output any one of the outputs of the still region decision unit and the film mode detection unit corresponding to the results of the decisions of the still region decision unit and the film mode detection unit.

The still region decision unit typically includes a decision unit to compare the SAD value with a predetermined threshold value and to determine whether the predetermined search region is the still region; a decision buffer to store a result of the decision of the decision unit; and a precision decision unit to output a signal indicating whether the predetermined search region is the motion region or the still region based on the results of the decisions on the predetermined search region and an ambient search region thereof stored in the decision buffer. At this time, the decision unit generally determines that the predetermined search region is the still region in the case wherein the SAD value is smaller than the predetermined threshold value and determines that the predetermined search region is the motion region in the case wherein the SAD value is larger than the predetermined threshold value.

Further, the 3D interpolation unit generally includes a temporal interpolation unit to insert lines of the previous and next fields corresponding to intermediate lines of a current field and performing interpolations; a spatial interpolation unit to insert data obtained by dividing data of two lines by two in an area between the two lines of the current field for interpolations; a motion information extraction unit to extract motion information between the previous field and the next field with reference to the current field; and a soft switching unit to mix outputs of the temporal interpolation unit and the spatial interpolation unit adaptively to generate an output based on the motion information.

To achieve the above aspect, the deinterlacing apparatus of the present invention comprises a buffer unit having a previous field buffer, a current field, and a next field buffer and to store, sequentially, lines of each of fields of an image signal which are successively inputted; a zero motion estimation unit to calculate an SAD value based on lines of the next field stored in the next field buffer and lines of the previous field stored in the previous field buffer; a still region/film mode detection unit to determine whether a predetermined search region is a still region and whether a source of the image signal is a film, based on the SAD value; a 3D interpolation unit to output a temporal interpolation (TI) value and a spatial interpolation (SI) value adaptively based on motion information; and an adaptive selection unit to output a deinterlacing result based on the outputs of the previous field, the next field, and the 3D interpolation unit according to an output signal of the still region/film mode detection unit.

The zero motion estimation unit generally includes a segment SAD calculation unit to calculate segment SAD values with respect to lines of a predetermined size; an SAD buffer unit to store the segment SAD values calculated by the segment SAD calculation unit; and a block SAD calculation unit to add the segment SAD values stored in the SAD buffer unit to calculate an SAD value. Further, the segment SAD calculation unit typically calculates the segment SAD values based on the following formula with respect to the lines of a predetermined size:

$$SAD=\Sigma\{(x)\epsilon L\}|f(x,y,t-1)-f(x,y,t+1)|,$$

wherein L is a sum of x indices corresponding to pixels in a predetermined macro block, (x,y) indices correspond to pixels inside the predetermined macro block, and t represents time.

The still region/film mode detection unit generally includes a still region decision unit to determine whether the predetermined search region is the still region or the motion region based on the SAD value; a film mode detection unit to determine whether the source of the image signal is a film based on a result of the decision of the still region; and a multiplexing unit to output one of the outputs of the still region decision unit and the film mode detection unit.

The still region decision unit typically includes a decision unit to compare the SAD value with a predetermined threshold value and to determine whether the predetermined search region is the still region; a decision buffer to store a result of the decision of the decision unit; and a precision decision unit to output a signal indicating whether the predetermined search region is the still region based on results of the decisions on the predetermined search region and an ambient search region thereof stored in the decision buffer. Then, the decision unit generally determines that the predetermined search region is the still region if the SAD value is smaller than the predetermined threshold value, and determines that the predetermined search region is the motion region if the SAD value is larger than the predetermined threshold value.

Further, the 3D interpolation unit typically includes a temporal interpolation unit to insert the previous and next field lines corresponding to the intermediate lines of the current field for interpolations; a spatial interpolation unit to insert data obtained from dividing data of two lines of the current field by two in a region between the two lines for interpolations; a motion information extraction unit to extract motion information between the previous field and the next field with reference to the current field; and a soft switching unit to mix outputs of the temporal interpolation unit and the spatial interpolation unit adaptively based on the motion information for an output.

The deinterlacing method of the present invention comprises storing sequentially a previous field, a current field, and a next field of an image signal which are successively inputted; calculating an SAD value by a predetermined search region unit with reference to the next field and the previous field; determining whether the predetermined search region is a still region and whether a source of the image signal is a film based on the SAD value; outputting a temporal interpolation (TI) value and a spatial interpolation (SI) value adaptively based on motion information; and outputting a deinterlacing result based on the previous field, the next field, and the TI value and/or the SI value according to whether the predetermined search region is a still region or a film.

The search region is a macro block having a predetermined size, and the calculating the SAD value is typically based on the following formula:

$$SAD=\Sigma\{(x,y)\epsilon B\}|f(x,y,t-1)-f(x,y,t+1)|,$$

wherein the B is a sum of (x,y) indices corresponding to pixels inside the macro block and t represents time.

The determining whether the predetermined search is a still region and whether a source of the image signal is a film generally preferably includes determining whether the predetermined search region is the still region or a motion region based on the SAD value; determining whether the source of an image signal is the film based on whether the predetermined search region is a still region or a motion region; and outputting an output in correspondence with the determinations.

The determining whether the predetermined search report is a still region and whether a source of the image signal is a film typically includes comparing the SAD value with a predetermined threshold value and determining whether the predetermined search region is the still region; and outputting a signal indicating whether the predetermined search region is a still region or a motion region based on results of stored decision values of the predetermined search region and an ambient search region thereof. Then, the predetermined search region is generally determined to be the still region when the SAD value is smaller than the predetermined threshold value, and to be the motion region when the SAD value is larger than the predetermined threshold value.

Further, the outputting of the TI value and SI value generally includes inserting lines of the previous and next fields corresponding to intermediate lines of a current field and performing interpolations; inserting data obtained by dividing data of two lines by two in an area between the two lines of the current field for interpolations; extracting motion information between the previous and next fields with reference to the current field; and mixing interpolation outputs and extracted motion information outputs adaptively for an output based on the motion information.

The deinterlacing method of the present invention to achieve the above aspect comprises sequentially storing lines of each of a previous field, a current field, and a next field of an image signal which are successively inputted; calculating an SAD value based on lines of the next field and lines of the previous field; determining whether a predetermined search region is a still region and whether a source of the image signal is a film, based on the SAD value; outputting adaptively a temporal interpolation (TI) value and a spatial interpolation (SI) value based on motion information; and outputting a deinterlacing result based on outputs of the lines of the previous and next fields, the TI value, and the SI value according to a result of determining whether the predetermined search region is a still region and whether a source of the image signal is a film.

Calculating the SAD value generally includes calculating segment SAD values with respect to lines of a predetermined size; storing the segment SAD values; and adding the stored segment SAD values to calculate an SAD value. Further, the predetermined search region generally calculates the segment SAD values based on the following formula with respect to the lines of a predetermined size:

$$SAD=\Sigma\{(x)\epsilon L\}|f(x,y,t-1)-f(x,y,t+1)|,$$

wherein L is a sum of x indices corresponding to pixels in a predetermined macro block, (x,y) indices correspond to pixels inside the predetermined macro block, and t represents time.

Determining whether a predetermined search region is a still region and whether a source of the image signal is a film includes determining whether the predetermined search region of the current field is the still region or the motion region based on the SAD value; determining whether the source of the image signal is a film based on the still/motion region determination; and outputting one of a still region, a motion region and/or a film source corresponding to the determination Determining whether the predetermined search region of the current field is the still region on the motion region generally includes comparing the SAD value with a predetermined threshold value and determining whether the predetermined search region is the still region; and outputting a signal indicating whether the predetermined search region is the still region based on results of the stored decisions on the predetermined search region and an ambient search region thereof. Then, the predetermined search region is generally determined to be the still region if the SAD value is smaller than the predetermined threshold value, and is determined to be the motion region if the SAD value is larger than the predetermined threshold value.

Further, outputting adaptively a TI value and a SI value generally includes inserting the previous and next field lines corresponding to intermediate lines between the lines of the current field for interpolations; inserting data obtained from dividing data of two lines of the current field by two in a region between the two lines for interpolations; extracting motion information between the previous and next fields with reference to the current field; and mixing adaptively interpolation outputs and extracted motion information outputs based on the motion information for an output.

BRIEF DESCRIPTION OF THE DRAWINGS

These and/or other aspects and advantages of the invention will become apparent and more readily appreciated from the following description of an preferred embodiments, taken in conjunction with the accompanying drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Hereinafter, the present invention is described in more detail with reference to the accompanying drawings.

Figure 2:
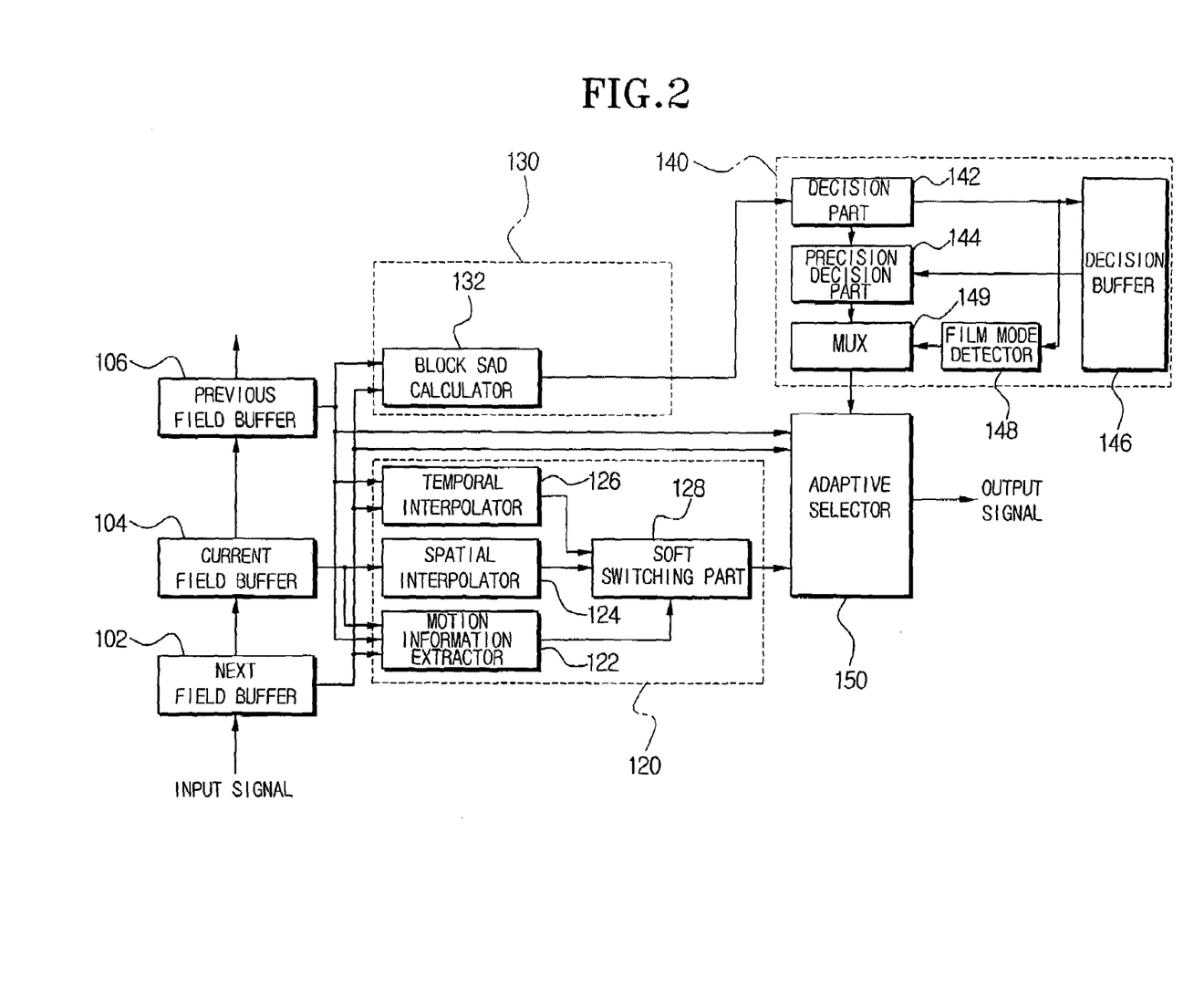
FIG. 2 is a block diagram of a deinterlacing apparatus according to an embodiment of the present invention.

FIG. 2 is a block diagram for a deinterlacing apparatus according to an embodiment of the present invention. The present deinterlacing apparatus has a next field buffer 102, a current field buffer 104, a previous field buffer 106, a 3D interpolator 120, a zero motion estimator 130, a still region/film mode detector 140, and an adaptive selector 150.

The 3D interpolator 120 is constructed with a motion information extractor 122, a spatial interpolator 124, a temporal interpolator 126, and a soft switching part 128. A still region/film mode detector 140 is structured with a decision part 142, a precision decision part 144, a decision buffer 146, a film mode detector 148, and a multiplexer MUX 149.

Each field of a continuously inputting image signal is sequentially stored in the previous field buffer 106, current field buffer 104, and next field buffer 102 in order of inputs. For example, in case of FIG. 1A to FIG. 1C, the fields of an image signal displaying an image of FIG. 1A are stored in the previous field buffer 106, in the case of FIG. 1B, in the current field buffer 104, and, in the case of FIG. 1C, in the next field buffer 106, respectively.

The 3D interpolator 120 extracts motion information and interpolates frames based on motions. That is, the motion information extractor 122 extracts motion information indicating small or big motions within successive fields around pixels of a current field to be interpolated. The spatial interpolator 124 calculates an edge direction included in pixel values around pixels to be interpolated with inputs of pixel values of field data of a region to be interpolated currently and ambient pixel values within a field, and then performs interpolations in a time-axis direction. That is, interpolations are carried out with averaging pixel values of a previous field and a next field with respect to a field image to be interpolated currently.

The soft switching part 128 adaptively mixes outputs of the spatial interpolator 124 and the temporal interpolator 126 for an output, based on the degree of the motions extracted from the motion information extractor 122. That is, the soft switching part 128 generates an output by performing one of a spatial interpolation, a temporal interpolation, and a mixed interpolation of the two interpolations.

A block SAD calculator 132 in the zero motion estimator 130 compares a previous field stored in the previous field buffer 106 to an image corresponding to a macro block of a certain size in a next field stored in the next field buffer 102 and then calculates a summed absolute value(SAD). Setting a previous field image to f(x,y,t−1) and a next field image to f(x,y,t+1), the SAD results from Formula 1 are as follows.

$$SAD=\Sigma\{(x,y)\in B\}|f(x,y,t-1)-f(x,y,t+1)| \quad \text{Formula 1}$$

wherein the B is a sum of (x,y) indices corresponding to pixels in a macro block and t represents time. An output value of the zero motion estimator 130 is transferred to the still region/film mode detector 140.

The still region/film mode detector 148 detects whether a given macro block is a still region and whether an image signal inputted is a film mode obtained from a film source. That is, the decision part 142 compares an SAD value in a given macro block to a predetermined threshold value, determines that the predetermined search region is a still region if the SAD value is smaller than the threshold value, and determines that the predetermined search region is a motion region if the SAD value is larger than the threshold value. The decision result so obtained is stored in the decision buffer 146.

Figure 3:
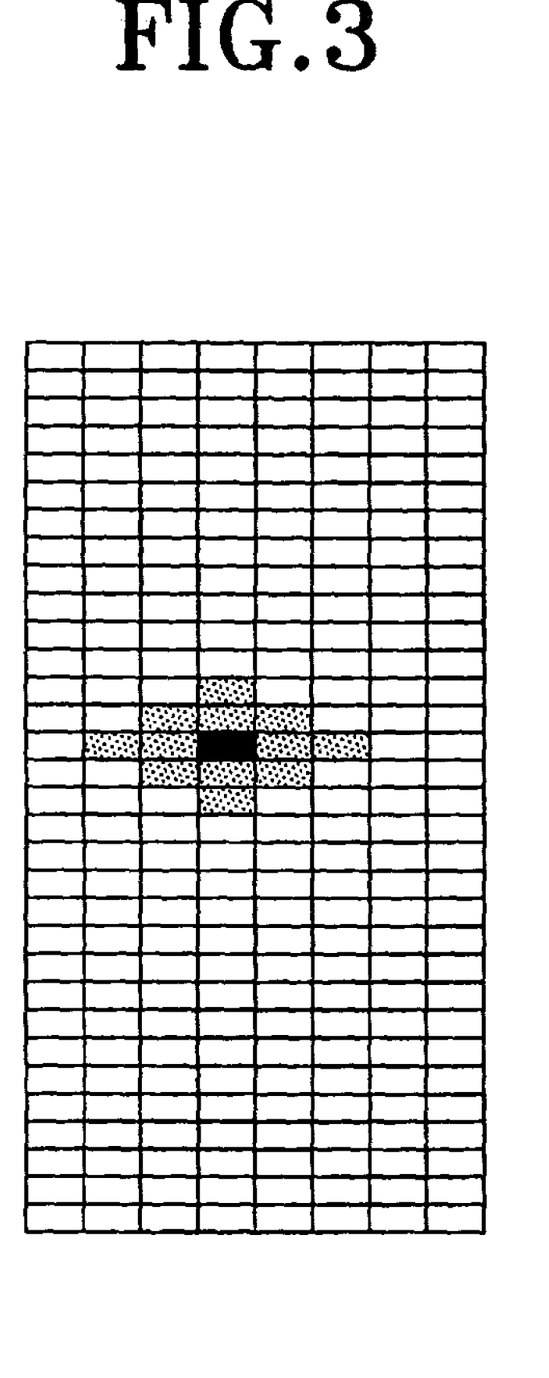
FIG. 3 is a view to show a decision buffer.

FIG. 3 shows the decision buffer 146. In FIG. 3, a portion shaded in black indicates an area in which a decision result of a macro block for which a current SAD value is obtained is stored, and a dotted portion indicates an area in which a decision result for macro blocks around a current macro block is stored. Thus, a decision result is stored by macro block unit rather than by pixel unit, so the decision buffer 146 may become smaller in size compared to the case in which the decision result is stored by pixel unit. The precision decision part 144 integrally analyzes decision results of a current macro block and its ambient macro blocks which are stored in the decision buffer 146, and finally determines whether the predetermined search region is a still region. An output signal of the precision decision part 144 is transferred to the adaptive selector 150 through the MUX 149.

The film mode detector 148 analyzes decision results obtained from the decision part 142 while performing the deinterlacing with respect to all the macro blocks of a current field. That is, the film mode detector 148 counts and uses the number of macro blocks that resulted in motion regions as decision results of the decision part 142 to determine whether an image being inputted is made by interlacing through the 3:2 pull-down process of a 24 Hz film.

24 sequential frames per second are constructed for film sources, and 60 interlace fields per second are constructed for general TVs. Therefore, to convert a film source into interlace fields, three fields of a bottom field, a top field, and another top field are extracted from one frame, and two fields of a top and a bottom field are extracted from a next frame. Such a process is referred to as the 3:2 pull-down process. Accordingly, a film mode may be determined by calculating and using the number of blocks determined to be motion regions.

The adaptive selector 150 uses results transferred from the still region/film mode detector 140 to output a final deinterlacing result. That is, if it is determined that a source of the image signal is a film or a predetermined search region is a still region as a result of the decision of the still region/film mode detector 140, the adaptive selector 150 uses a previous field and a next field respectively stored in the previous field buffer 106 and the next field buffer 104 to output a deinterlacing result. Further, if it is determined that the predetermined search region is a still region or the source of the image signal is a film, the adaptive selector 150 selects an output of the 3D interpolator 120 for an output thereof. Then, the adaptive selector 150 adaptively performs the deinterlacing based on whether the predetermined search region is a still region or a motion region, and whether the source of the image signal is a film.

Figure 4:
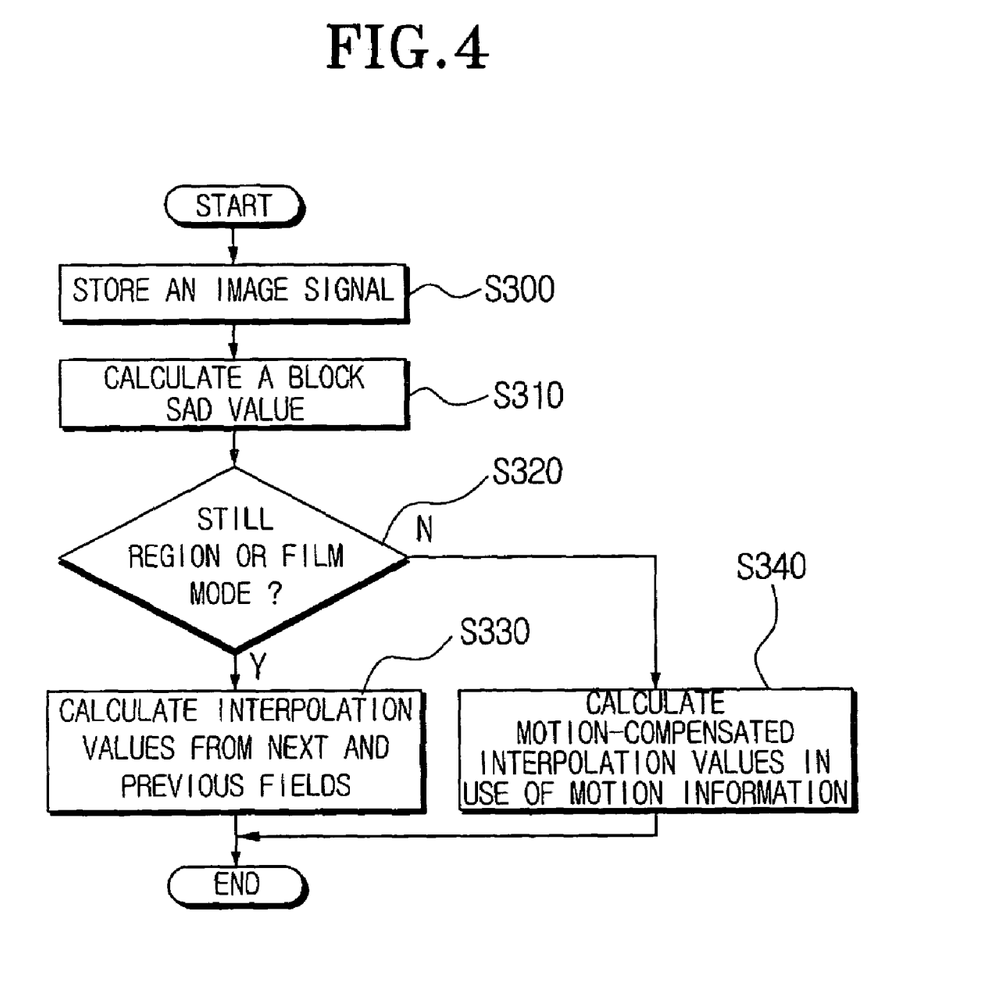
FIG. 4 is a flow chart to explain an operation process of the deinterlacing apparatus of FIG. 3.

FIG. 4 is a flow chart to explain an operation method of the deinterlacing apparatus shown in FIG. 2. With reference to the flow chart, first, individual fields of an image signal which are successively inputted are sequentially stored in the previous field buffer 106, the current field buffer 104, and the next field buffer 102, based on an order of inputs (S300).

The zero motion estimator 130 calculates block SAD values from a stored image signal (S310). The still region/film mode detector 140 determines whether the predetermined search region is a still region or whether the source of the image signal is a film based on the calculated block SAD values (S320). If the predetermined search region is determined to be a still region or the source of the image signal is determined to be a film as decision results, the zero motion estimator 130 calculates interpolation values from a next field and a previous field (S330). If the predetermined search region is not a still region or the source the image signal is determined not to be a film, the zero motion estimator 130 outputs interpolation values calculated from the 3D interpolator 120 (S340).

Figure 5:
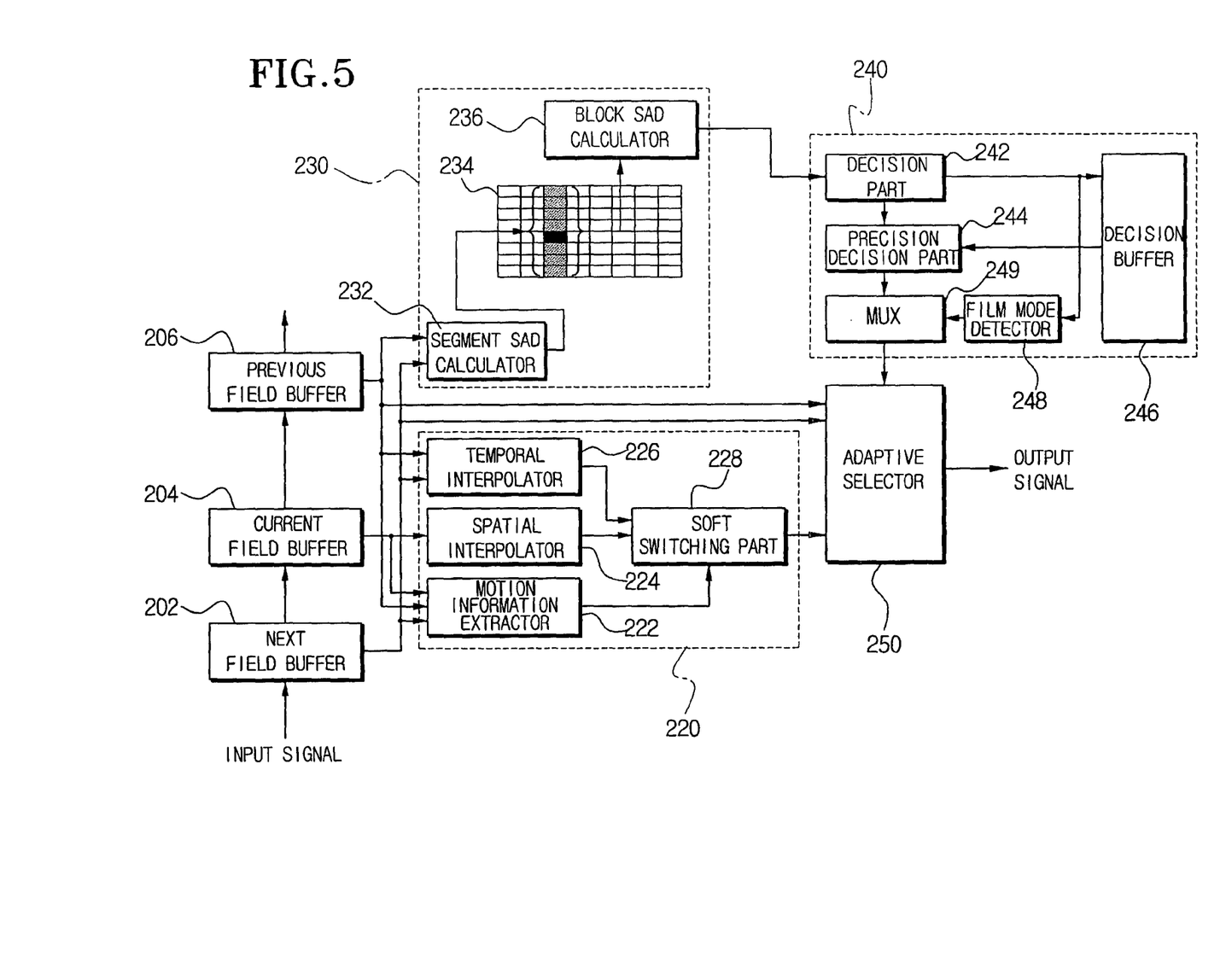
FIG. 5 is a block diagram of a deinterlacing apparatus according to another embodiment of the present invention.

FIG. 5 is a block diagram to show a deinterlacing apparatus according to another embodiment of the present invention.

Referring to the block diagram, the deinterlacing apparatus has a next field buffer 202, a current field buffer 204, a previous field buffer 206, a 3D interpolator 220, a zero motion estimator 230, a still region/film mode detector 240, and an adaptive selector 250.

As shown in the block diagram, the deinterlacing apparatus of FIG. 5 has the zero motion estimator 230 with a different structure than the zero motion estimator 130 deinterlacing apparatus of FIG. 2. For example, the zero motion estimator 230 of FIG. 5 has a difference in that the unit for storage in the previous field buffer 206, current field buffer 204, and next field buffer 202 is field lines, compared to the unit of storage of an image signal by the zero motion estimator 130 of the deinterlacing apparatus of FIG. 2, which is individual fields.

The functions of the 3D interpolator 220, still region/film mode detector 240, and adaptive selector 250 are the same as the functions of the 3D interpolation 120, the still region/film mode detector 140, and the adaptive selector 150, respectively in the deinterlacing apparatus described in FIG. 2. Accordingly, hereinafter, descriptions are mainly made on parts with different functions.

Individual field lines of an image signal which are successively inputted are sequentially stored in the previous field buffer 206, current field buffer 204, and next field buffer 202 based on an order of inputs. A buffer may become smaller in size compared to the deinterlacing apparatus shown in FIG. 2, owing to storage of an inputted image signal by a line unit other than a field line.

The zero motion calculator 230 is constructed with a segment SAD calculator 232, an SAD buffer 234, and a block SAD calculator 236.

The segment SAD calculator 232 calculates an SAD value by comparing images from a previous field and a next field which are corresponding to line segments of a certain size. Setting an image of a previous field to f(x,y,t−1) and an image of a next field to f(x,y,t+1), an SAD value is obtained from Formula 2 as below.

$$SAD=\Sigma\{(x)\epsilon L\}|f(x,y,t-1)-f(x,y,t+1)| \quad \text{Formula 2}$$

wherein L is a set of x indices corresponding to pixels in a line segment, (x,y) indices correspond to pixels inside the predetermined macro block, and t represents time. The calculated SAD values are stored in the SAD buffer 234 which stores the values. The size of the SAD buffer 234 corresponds to the y-direction size of the macro block described in the deinterlacing of FIG. 2, and the number of the SAD buffer 234 corresponds to the x-direction size of the macro blocks. The SAD buffer 234 stores SAD values of line segments corresponding to the same positions of previous lines. The block SAD calculator 236 adds all the values stored in the SAD buffer 234 and calculates a value corresponding to a SAD value of macro blocks. That is, the block SAD calculator 236 calculates and transfers to the still region/film mode calculator 240 the same SAD value as in the deinterlacing apparatus shown in FIG. 2. Then, the remaining procedures of the deinterlacing apparatus of FIG. 5 are performed in the same way as the procedures are performed in the deinterlacing apparatus of FIG. 2.

As described above, the present invention searches for still regions and motion regions within fields to be interpolated and performs the deinterlacing suitable thereto. Accordingly, an image quality is improved with a relatively simple hardware structure.

Where desired, the operations of the present invention may be incorporated into computer-executable instructions that may be stored on a computer-readable medium.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A deinterlacing apparatus, comprising:
   a buffer unit having a previous field buffer, a current field buffer, and a next field buffer to store, sequentially, individual fields of an image signal which are successively inputted;
   a zero motion estimation unit to calculate a Sum of Absolute Difference (SAD) value by a predetermined search region unit with reference to a next field stored in the next field buffer and a previous field stored in the previous field buffer;
   a still region/film mode detection unit to determine whether the predetermined search region is a still region and whether a source of the image signal is a film based on the SAD value;
   a 3D interpolation unit to output adaptively a temporal interpolation value and a spatial interpolation value based on motion information; and
   an adaptive selection unit to output a deinterlacing result based on the previous field, the next field, and an output of the 3D interpolation unit according to a signal outputted from the still region/film mode detection unit.

2. The apparatus as claimed in claim 1, wherein the search region is a macro block having a predetermined size, and the zero motion estimation unit calculates the SAD value based on a following formula:

$$SAD=\Sigma\{(x,y)\epsilon B\}|f(x,y,t-1)-f(x,y,t+1)|,$$

wherein B is a sum of (x,y) indices corresponding to pixels inside the macro block and t represents time.

3. The apparatus as claimed in claim 1, wherein the still region/film mode detection unit comprises:
   a still region decision unit to determine whether the predetermined search region is the still region or a motion region based on the SAD value;
   a film mode detection unit to determine whether the source of an image signal is the film based on a result of a determination of the still region decision unit; and
   a multiplexing unit to output one of outputs of the still region decision unit and the film mode detection unit corresponding to results of determinations of the still region decision unit and the film mode detection unit.

4. The apparatus as claimed in claim 3, wherein the still region decision unit includes:
   a decision unit to compare the SAD value with a predetermined threshold value and determining whether the predetermined search region is the still region;
   a decision buffer to store a result of the decision of the decision unit; and
   a precision decision unit to output a signal indicating whether the predetermined search region is the still region based on results of the determinations on the predetermined search region and an ambient search region thereof stored in the decision buffer.

5. The apparatus as claimed in claim 4, wherein the decision unit determines that the predetermined search region is the still region when the SAD value is smaller than the predetermined threshold value and is the motion region when the SAD value is larger than the predetermined threshold value.

6. The apparatus as claimed in claim 1, wherein the 3D interpolation unit includes:
- a temporal interpolation unit to insert lines of the previous and next fields corresponding to intermediate lines of a current field and performing interpolations;
- a spatial interpolation unit to insert data obtained by dividing data of two lines by two in an area between the two lines of the current field for interpolations;
- a motion information extraction unit to extract motion information between the previous field and the next field with reference to the current field; and
- a soft switching unit to mix outputs of the temporal interpolation unit and the spatial interpolation unit adaptively to generate an output based on the motion information.

7. A deinterlacing apparatus, comprising:
- a buffer unit having a previous field buffer, a current field, and a next field buffer and to store, sequentially, lines of each of fields of an image signal which are successively inputted;
- a zero motion estimation unit to calculate a Sum of Absolute Difference (SAD) value based on lines of the next field stored in the next field buffer and lines of the previous field stored in the previous field buffer;
- a still region/film mode detection unit to determine whether a predetermined search region is a still region and whether a source of the image signal is a film, based on the SAD value;
- a 3D interpolation unit to output, adaptively, a temporal interpolation value and a spatial interpolation value based on motion information; and
- an adaptive selection unit to output a deinterlacing result based on outputs of the previous field, the next field, and the 3D interpolation unit according to an output signal of the still region/film mode detection unit.

8. The deinterlacing apparatus as claimed in claim 7, wherein the zero motion estimation unit includes:
- a segment SAD calculation unit to calculate segment SAD values with respect to lines of a predetermined size;
- an SAD buffer unit to store the segment SAD values calculated from the segment SAD calculation unit; and
- a block SAD calculation unit to add the segment SAD values stored in the SAD buffer unit to calculate an SAD value.

9. The deinterlacing apparatus as claimed in claim 8, wherein the segment SAD calculation unit calculates the segment SAD values based on a following formula with respect to the lines of a predetermined size:

$$SAD=\Sigma\{(x)\in L\}|f(x,y,t-1)-f(x,y,t+1)|,$$

wherein L is a sum of x indices corresponding to pixels in a predetermined macro block, (x, y) indices correspond to pixels inside the macro block, and t represents time.

10. The deinterlacing apparatus as claimed in claim 7, wherein the still region/film mode detection unit includes:
- a still region decision unit to determine whether the predetermined search region is the still region or the motion region based on the SAD value;
- a film mode detection unit to determine whether the source of the image signal is a film based on a result of the decision of the still region; and
- a multiplexing unit to output any one of outputs of the still region decision unit and the film mode detection unit corresponding to results of determinations of the still region decision unit and the film mode detection unit.

11. The deinterlacing apparatus as claimed in claim 10, wherein the still region decision unit includes:
- a decision unit to compare the SAD value with a predetermined threshold value and to determine whether the predetermined search region is the still region;
- a decision buffer to store a result of a determination of the decision unit; and
- a precision decision unit to output a signal indicating whether the predetermined search region is the still region based on results of determinations on the predetermined search region and an ambient search region thereof stored in the decision buffer.

12. The deinterlacing apparatus as claimed in claim 11, wherein the decision unit determines that the predetermined search region is the still region if the SAD value is smaller than the predetermined threshold value, and determines that the predetermined search region is the motion region if the SAD value is larger than the predetermined threshold value.

13. The deinterlacing apparatus as claimed in claim 7, wherein the 3D interpolation unit includes:
- a temporal interpolation unit to insert the previous and next field lines corresponding to intermediate lines of the current field for interpolations;
- a spatial interpolation unit to insert data obtained from dividing data of two lines of the current field by two in a region between the two lines for interpolations;
- a motion information extraction unit to extract motion information between the previous field and the next field with reference to the current field; and
- a soft switching unit to mix, adaptively, outputs of the temporal interpolation unit and the spatial interpolation unit based on the motion information for an output.

14. A deinterlacing method, comprising:
- storing sequentially a previous field, a current field, and a next field of an image signal which are successively inputted;
- calculating a Sum of Absolute Difference (SAD) value by a predetermined search region unit with reference to the next field and the previous field;
- determining whether the predetermined search region is a still region and whether a source of the image signal is a film based on the SAD value;
- outputting adaptively a temporal interpolation (TI) value and a spatial interpolation (SI) value based on motion information; and
- outputting a deinterlacing result based on the previous field, the next field, the TI value and the SI value according to whether the predetermined search region is the still region and whether the source of the image signal is the film.

15. The deinterlacing method as claimed in claim 14, wherein the search region is a macro block having a predetermined size, and the calculating of the SAD value is based on a following formula:

$$SAD=\Sigma\{(x,y)\in B\}|f(x,y,t-1)-f(x,y,t+1)|,$$

wherein B is a sum of (x,y) indices corresponding to pixels inside the macro block and t represents time.

16. The deinterlacing method as claimed in claim 14, wherein determining whether the predetermined search region is the still region and whether the source of the image signal is the film comprises:
- determining whether the predetermined search region is the still region or a motion region based on the SAD value;
- determining whether the source of the image signal is the film based on a result of whether the predetermined search region is the still region or the motion region; and outputting an output in correspondence with a still region determination, a motion region determination and a film determination.

17. The deinterlacing method as claimed in claim 16, wherein determining whether the predetermined search region is the still region or the motion region based on the SAD value comprises:
comparing the SAD value with a predetermined threshold value and determining whether the predetermined search region is the still region; and
outputting a signal indicating whether the predetermined search region is the still region based on results of determination values of the predetermined search region and an ambient search region thereof which are stored.

18. The deinterlacing method as claimed in claim 17, including determining that the predetermined search region is the still region when the SAD value is smaller than the predetermined threshold value, and is the motion region when the SAD value is larger than the predetermined threshold value.

19. The deinterlacing method as claimed in claim 14, wherein outputting adaptively the TI value and the SI value comprises:
inserting lines of the previous and next fields corresponding to intermediate lines of a current field and performing interpolations;
inserting data obtained by dividing data of two lines by two into an area between the two lines of the current field for interpolations;
extracting motion information between the previous and next fields with reference to the current field; and
mixing adaptively line interpolation outputs and extracted motion information outputs to generate an output based on the motion information.

20. A deinterlacing method, comprising:
storing sequentially lines of each of a previous field, a current field, and a next field of an image signal which are successively inputted;
calculating a Sum of Absolute Difference (SAD) value based on lines of the next field and lines of the previous field;
determining whether a predetermined search region is a still region and whether a source of the image signal is a film, based on the SAD value;
outputting adaptively a temporal interpolation (TI) value and a spatial interpolation (SI) value based on motion information; and
outputting a deinterlacing result based on outputs of the lines of the previous and next fields, the TI value and the SI value and according to a result of the determining whether the predetermined search region is the still region and whether the source of the image signal is the film, based on the SAD value.

21. The deinterlacing method as claimed in claim 20, wherein the calculating of the SAD value comprises:
calculating segment SAD values with respect to lines of a predetermined size;
storing the segment SAD values; and
adding the stored segment SAD values to calculate an SAD value.

22. The deinterlacing method as claimed in claim 21, wherein the calculating of the segment SAD values with respect to lines of the predetermined size includes calculating the segment SAD values based on a following formula with respect to the lines of a predetermined size:

$$SAD=\Sigma\{(x)\epsilon L\}|f(x,y,t-1)-f(x,y,t+1)|,$$

wherein L is a sum of x indices corresponding to pixels in a predetermined macro block, (x,y) are indices corresponding to pixels inside the macro block, and t represents time.

23. The deinterlacing method as claimed in claim 20, wherein the determining whether the predetermined search region is the still region and whether the source of the image signal is the film comprises:
determining whether the predetermined search region of the current field is the still region or the motion region based on the SAD value;
determining whether the source of the image signal is a film based on a result of a determination whether the predetermined search region of the current field is the still region or the motion region based on the SAD value; and
outputting one of a still region determination, a motion region determination and a film determination based on the determinations.

24. The deinterlacing method as claimed in claim 23, wherein determining whether the predetermined search region of the current field is the still region or the motion region based on the SAD value comprises:
comparing the SAD value with a predetermined threshold value and determining whether the predetermined search region is the still region; and
outputting a signal indicating whether the predetermined search region is the still region based on results of determinations on the predetermined search region and an ambient search region thereof which are stored.

25. The deinterlacing method as claimed in claim 24, including determining that the predetermined search region is the still region if the SAD value is smaller than the predetermined threshold value, and is the motion region if the SAD value is larger than the predetermined threshold value.

26. The deinterlacing method as claimed in claim 20, wherein outputting the TI value and the SI value comprises:
inserting the previous and next field lines corresponding to intermediate lines of the current field for interpolations;
inserting data obtained from dividing data of two lines of the current field by two in a region between the two lines for interpolations;
extracting motion information between the previous and next fields with reference to the current field; and
mixing adaptively line interpolation outputs and extracted motion information outputs based on the motion information for an output.

27. A computer-readable medium having stored thereon computer-executable instructions to deinterlace image signals, the computer-executable instructions comprising:
storing sequentially a previous field, a current field, and a next field of an image signal which are successively inputted;
calculating a Sum of Absolute Difference (SAD) value by a predetermined search region unit with reference to the next field and the previous field;
determining whether the predetermined search region is a still region and whether a source of the image signal is a film based on the SAD value;
outputting adaptively a temporal interpolation (TI) value and a spatial interpolation (SI) value based on motion information; and
outputting a deinterlacing result based on the previous field, the next field, the TI value and the SI value according to whether the predetermined search region is the still region and whether the source of the image signal is the film.

28. The computer-readable medium as claimed in claim 27, wherein the search region is a macro block having a predetermined size, and calculating the SAD value is based on a following formula:

$$SAD=\Sigma\{(x,y)\in B\}|f(x,y,t-1)-f(x,y,t+1)|,$$

wherein the B is a sum of (x,y) indices corresponding to pixels inside the macro block and t represents time.

29. The computer-readable medium as claimed in claim 27, wherein the determining whether the predetermined search region is the still region and whether the source of the image signal is the film comprises:
   determining whether the predetermined search region is the still region or a motion region based on the SAD value;
   determining whether the source of the image signal is the film based on a result of whether the predetermined search region is the still region or the motion region; and
   outputting an output in correspondence with a still region determination, a motion region determination and a film determination.

30. The computer-readable medium as claimed in claim 29, wherein determining whether the predetermined search region is the still region or the motion region based on the SAD value comprises:
   comparing the SAD value with a predetermined threshold value and determining whether the predetermined search region is the still region; and
   outputting a signal indicating whether the predetermined search region is the still region based on results of determination values of the predetermined search region and an ambient search region thereof which are stored.

31. The computer-readable medium as claimed in claim 30, including determining that the predetermined search region is the still region when the SAD value is smaller than the predetermined threshold value, and is the motion region when the SAD value is larger than the predetermined threshold value.

32. The computer-readable medium as claimed in claim 27, wherein outputting adaptively the TI value and the SI value comprises:
   inserting lines of the previous and next fields corresponding to intermediate lines of a current field and performing interpolations;
   inserting data obtained by dividing data of two lines by two into an area between the two lines of the current field for interpolations;
   extracting motion information between the previous and next fields with reference to the current field; and
   mixing adaptively line interpolation outputs and extracted motion information outputs to generate an output based on the motion information.

33. A computer-readable medium having stored thereon computer-executable instructions to deinterlace image signals, the computer-executable instructions comprising:
   storing sequentially lines of each of a previous field, a current field, and a next field of an image signal which are successively inputted;
   calculating a Sum of Absolute Difference (SAD) value based on lines of the next field and lines of the previous field;
   determining whether a predetermined search region is a still region and whether a source of the image signal is a film, based on the SAD value;
   outputting adaptively a temporal interpolation (TI) value and a spatial interpolation (SI) value based on motion information; and
   outputting a deinterlacing result based on outputs of the lines of the previous and next fields, the TI value and the SI value and according to a result of the determining whether the predetermined search region is the still region and whether the source of the image signal is the film, based on the SAD value.

34. The computer-readable medium as claimed in claim 33, wherein the calculating of the SAD value comprises:
   calculating segment SAD values with respect to lines of a predetermined size;
   storing the segment SAD values; and
   adding the stored segment SAD values to calculate an SAD value.

35. The computer-readable medium as claimed in claim 34, wherein the calculating of the segment SAD values with respect to lines of the predetermined size includes calculating the segment SAD values based on a following formula with respect to the lines of a predetermined size:

$$SAD=\Sigma\{(x)\in L\}|f(x,y,t-1)-f(x,y,t+1),$$

wherein L is a sum of x indices corresponding to pixels in a predetermined macro block, (x,y) are indices corresponding to pixels inside the macro block, and t represents time.

36. The computer-readable medium as claimed in claim 33, wherein determining whether a predetermined search region is the still region and whether the source of the image signal is the film comprises:
   determining whether the predetermined search region of the current field is the still region or the motion region based on the SAD value;
   determining whether the source of the image signal is a film based on a result of a determination whether the predetermined search region of the current field is the still region or the motion region based on the SAD value; and
   outputting one of a still region determination, a motion region determination and a film determination based on the determinations.

37. The computer-readable medium as claimed in claim 36, wherein determining whether the predetermined search region of the current field is the still region or the motion region based on the SAD value comprises:
   comparing the SAD value with a predetermined threshold value and determining whether the predetermined search region is the still region; and
   outputting a signal indicating whether the predetermined search region is the still region based on results of determinations on the predetermined search region and an ambient search region thereof which are stored.

38. The computer-readable medium as claimed in claim 37, including determining that the predetermined search region is the still region if the SAD value is smaller than the predetermined threshold value, and is the motion region if the SAD value is larger than the predetermined threshold value.

39. The computer-readable medium as claimed in claim 33, wherein outputting the TI value and the SI value includes:
   inserting the previous and next field lines corresponding to intermediate lines of the current field for interpolations;

inserting data obtained from dividing data of two lines of the current field by two in a region between the two lines for interpolations;

extracting motion information between the previous and next fields with reference to the current field; and mixing adaptively line interpolation outputs and extracted motion information outputs based on the motion information for an output.

* * * * *

UNITED STATES PATENT AND TRADEMARK OFFICE
CERTIFICATE OF CORRECTION

PATENT NO.        : 7,057,665 B2                                      Page 1 of 1
APPLICATION NO.   : 10/624574
DATED             : June 6, 2006
INVENTOR(S)       : You-young Jung et al.

It is certified that error appears in the above-identified patent and that said Letters Patent is hereby corrected as shown below:

Column 12, Line 53-54, change " $SAD - \sum \{(x,y) \in B\} | f(x,y,t-1) - f(x,y,t+1) |,$ "

to -- $SAD = \sum \{(x,y) \in B\} | f(x,y,t-1) - f(x,y,t+1) |,$ --.

Column 16, Line 25-26, change " $SAD = \sum \{(x) \in L\} | f(x,y,t-1) - f(x,y,t+1), |$ "

to -- $SAD = \sum \{(x) \in L\} | f(x,y,t-1) - f(x,y,t+1) |,$ --.

Signed and Sealed this

Thirtieth Day of January, 2007

JON W. DUDAS
*Director of the United States Patent and Trademark Office*